(12) United States Patent
Singh

(10) Patent No.: US 7,661,436 B2
(45) Date of Patent: Feb. 16, 2010

(54) LIQUID SEAL FOR RECOVERING FLARED GAS

(76) Inventor: Padam Singh, N 3/3, Neelam Tower, Ongc Colony, Bandra-Kurla Complex, Bandra (East):Bombay-400 051 (IN)

(*) Notice: Subject to any disclaimer, the term of this patent is extended or adjusted under 35 U.S.C. 154(b) by 421 days.

(21) Appl. No.: 10/568,192

(22) PCT Filed: Aug. 11, 2004

(86) PCT No.: PCT/IN2004/000243

§ 371 (c)(1), (2), (4) Date: Oct. 10, 2006

(87) PCT Pub. No.: WO2005/045173

PCT Pub. Date: May 19, 2005

(65) Prior Publication Data

US 2007/0144581 A1    Jun. 28, 2007

(30) Foreign Application Priority Data

Aug. 13, 2003  (IN) .......................... 800/MUM/2003
Aug. 13, 2003  (IN) .......................... 802/MUM/2003

(51) Int. Cl.
*F16K 13/10*   (2006.01)
(52) U.S. Cl. .................................... 137/252; 137/251.1
(58) Field of Classification Search .............. 137/251.1, 137/252
See application file for complete search history.

(56) References Cited

U.S. PATENT DOCUMENTS

| | | | | |
|---|---|---|---|---|
| 1,243,604 A | * | 10/1917 | Honeywell | 137/252 |
| 1,439,602 A | * | 12/1922 | Bradford | 137/252 |
| 1,479,374 A | * | 1/1924 | Conti | 137/252 |
| 1,618,109 A | * | 2/1927 | Sabbah | 137/251.1 |
| 2,565,616 A | * | 8/1951 | Mennesson | 137/252 |
| 2,792,070 A | * | 5/1957 | Strunk | 137/251.1 |
| 3,187,765 A | * | 6/1965 | Frank et al. | 137/253 |
| 3,222,259 A | | 12/1965 | Wall, Jr. | |
| 3,778,799 A | * | 12/1973 | Bendayan | 137/252 |
| 4,065,247 A | | 12/1977 | Okigami et al. | |
| 4,961,703 A | * | 10/1990 | Morgan | 137/251.1 |
| 2003/0106694 A1 | | 6/2003 | Wiseman | |

FOREIGN PATENT DOCUMENTS

FR           2 706 926         12/1994

\* cited by examiner

*Primary Examiner*—John Rivell

(57) ABSTRACT

The liquid seal according to the present invention consists of a U-tube (1, 2) having one arm (1) connected to the pipe (8) collecting all the gas vented from across the plant and other arm (2) connected to a liquid holder (5). A pipe (6) provided at the top of the liquid holder (5) is connected to the gas pipe (9) leading to the flare while there is a pipe (4) at the bottom of the said liquid holder fitted with a non-return valve (10) connecting to the bottom of U-tube (1, 2). There is provided a drain pipe (3) at the bottom U-tube (1, 2) to drain out the liquid if needed.

4 Claims, 5 Drawing Sheets

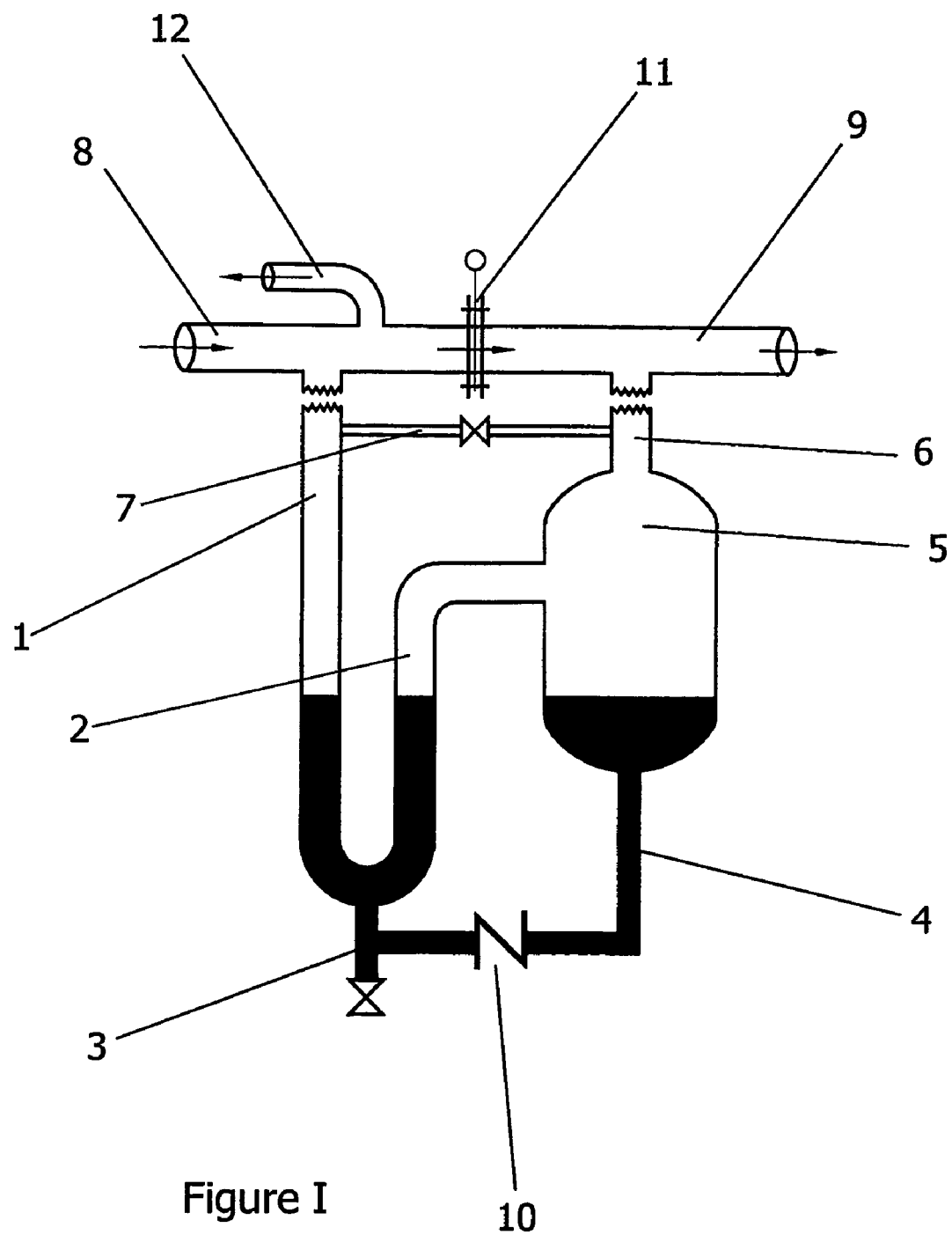
Figure I

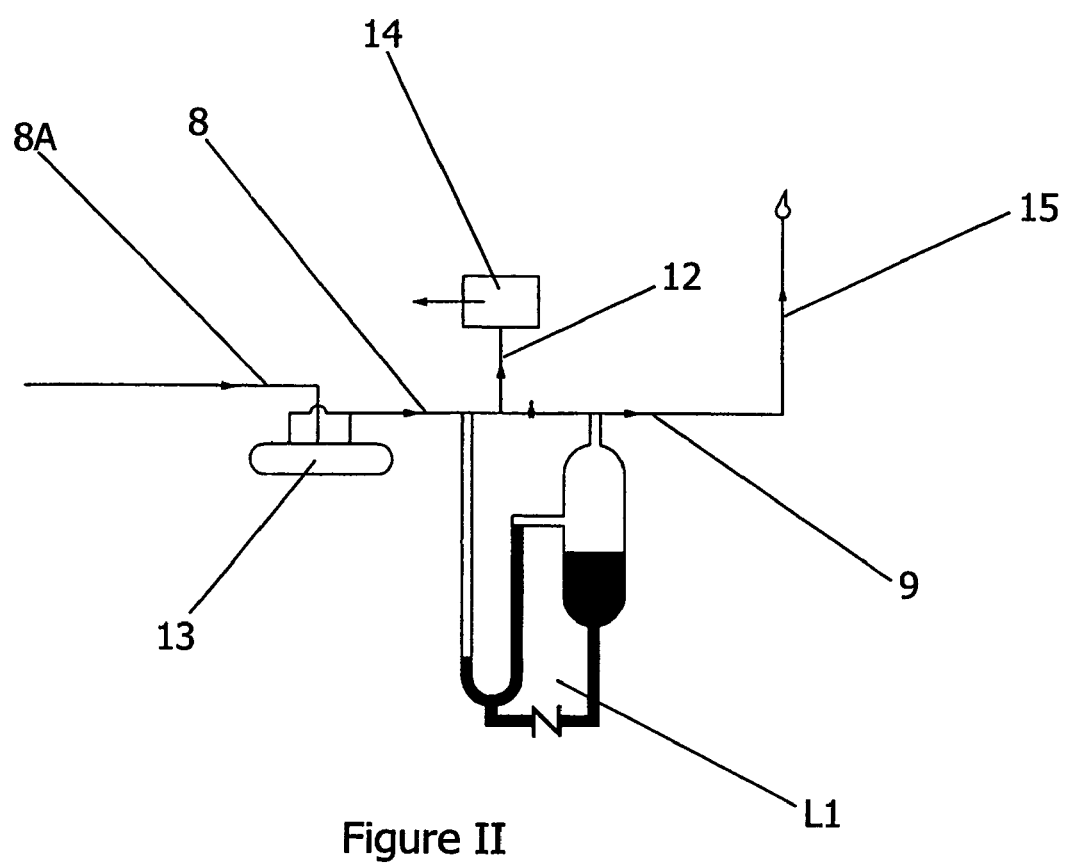
Figure II

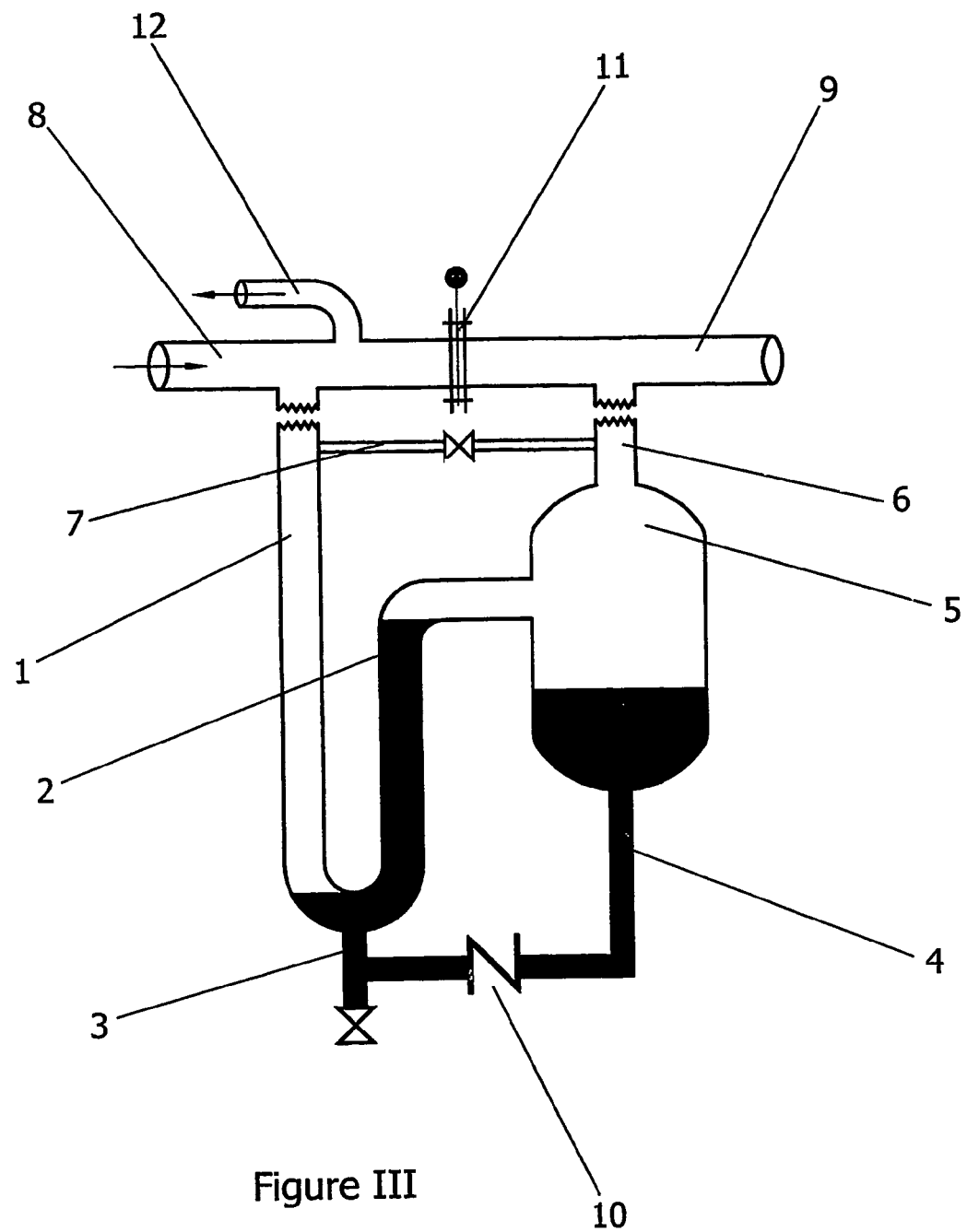
Figure III

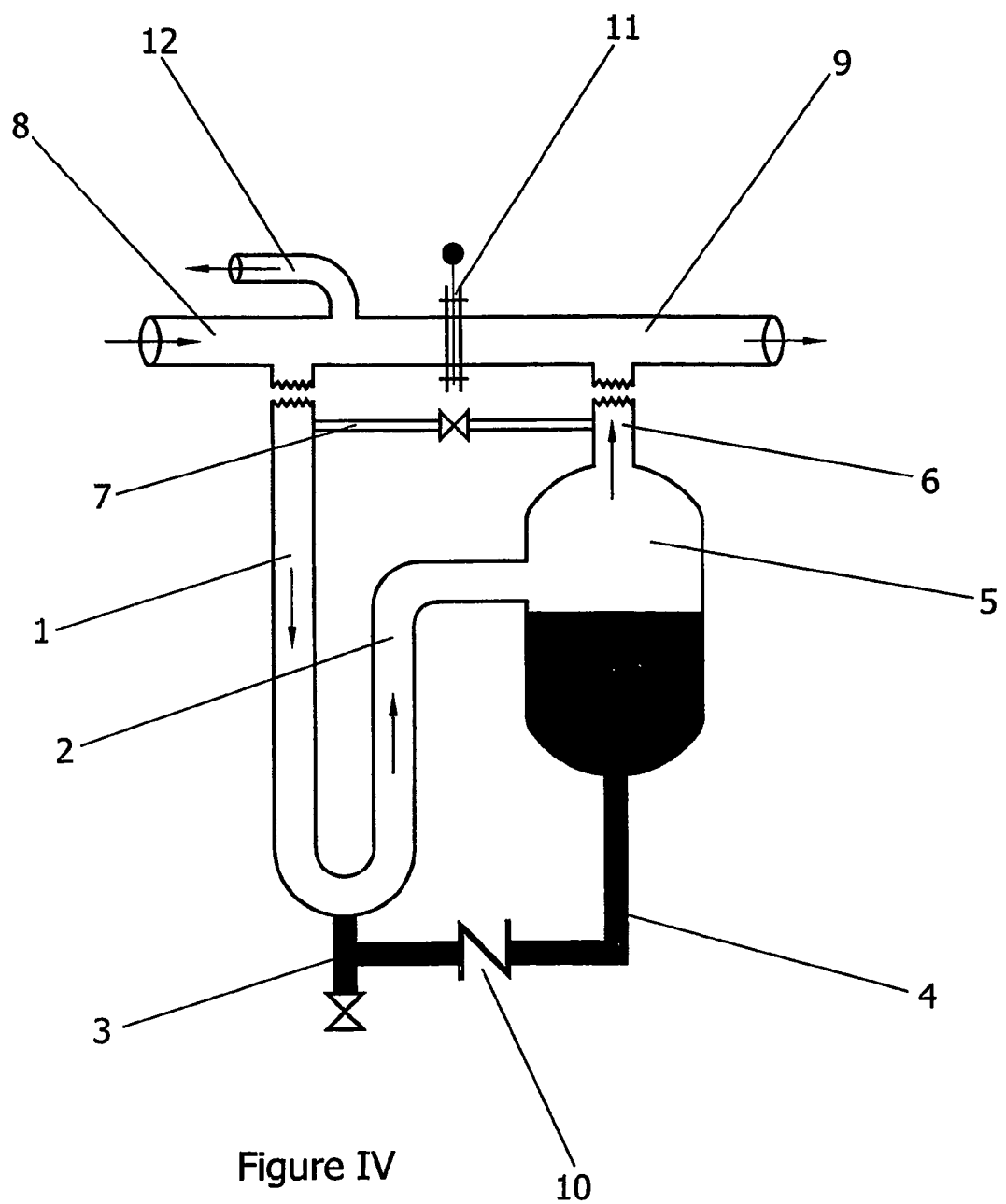
Figure IV

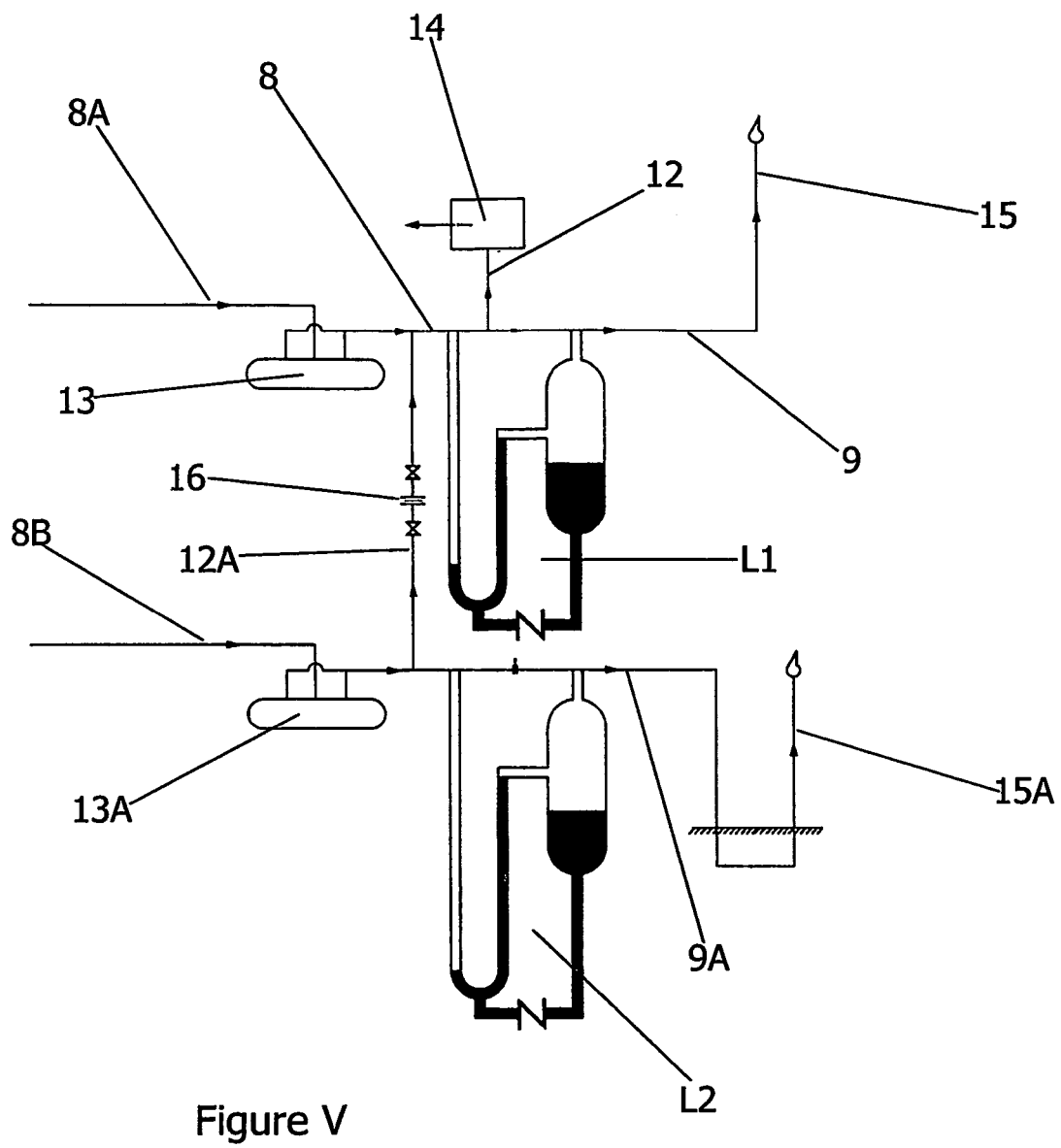
Figure V

LIQUID SEAL FOR RECOVERING FLARED GAS

FIELD OF THE INVENTION

The present invention relates to the recovery of discharged gases and more particularly to provide a liquid seal means forming a device enabling safe recovery of maximum quantity of vented gas; often flared from oil production facilities, refineries, petrochemical plants and the like and thereby reducing the quantity of gas flared to zero.

BACKGROUND OF THE INVENTION

In a hydrocarbon plant gas is vented from across the plant and this gas poses a safety hazard. This gas is collected and is burned, in a flare so as to reduce the risk of explosion as well as to ensure that uncombusted gas is not released in the atmosphere. There are available various processes by which this gas can be recovered, but not all the gas vented can be recovered as the quantity or the rate of vented gas is not constant: There is also a possibility of an upset in the plant releasing large amount of gas, often exceeding the recovery capacity installed. Such extra volume of gas available in the confined pipeline increases the pressure of gas making the gas difficult to recover. To avoid the possibility of any mishap the available systems are designed in such a way that a permanent flare is maintained by burning the vented gas. The burning of the vented gas involves substantial costs as this gas is very rich in hydrocarbon content and would have been otherwise recovered. Keeping a permanent flare also solves the problem of sudden and unexpected increase in the volume of vented gas as this gas will also be combusted in the flare.

While the gas at a relatively low pressure can be safely recovered, there is always a risk of the said unexpected increase in pressure making the recovery process difficult and unsafe. Another factor to be considered is to ensure that the recovery of gas does not cause a drop in the pressure of gas in the piping leading to the flare, as it can result in the ingress of atmospheric air into the flaring system creating an explosive mixture in the flare itself; endangering the plant.

An important objective of the present invention is to provide a safe means to allow the recovery of gas, at the same time maintaining utmost safety, and also to prevent the ingress of atmospheric air in the flaring mechanism.

Another important object of the present invention is to provide a seal means capable of breaking instantaneously due to an increase in pressure beyond a predetermined limit, thereby allowing the gas to escape to the flaring mechanism unrestrictedly and being burned safely.

It is a further objective of the present invention to enable total recovery of vented gas thereby reducing the quantity of gas flared to zero during normal operation.

An other important object of the present invention is to provide a means allowing diversion of gas from one flaring system to another flaring system where plurality of flares are used and thereby enabling recovery of gas at a centralized facility.

SUMMARY OF THE INVENTION

The liquid seal according to the present invention consists of a U-tube having one arm connected to the pipe collecting all the gas vented from across the plant and other arm connected to a liquid holder. A pipe provided at the top of the liquid holder is connected to the gas pipe leading to the flare while there is a pipe at the bottom of the said liquid holder fitted with a non-return valve connecting to the bottom of U-tube. There is provided a drain pipe at the bottom of U-tube to drain out the liquid if needed.

During normal operations all the vented gas is collected by a pipe and passed on to knock out drum (KOD). Due to the presence of a liquid seal and a piping blind between the KOD and the flare stack, the passage of gas to the flare stack is blocked. The gas passes from the KOD through a line to a recovery system and effectively all vented gas is recovered. As no gas escapes from the plant to the flare stake there is no need to keep the flare burning.

When the pressure of the gas increases in the gas pipe due to increase in the volume of vented gas or due to an upset, there is a resultant increase in the pressure of the gas inside the U-tube which causes displacement of the liquid. An increase in the pressure beyond a predetermined limit causes complete displacement of tie liquid from the U-tube; emptying the same to the liquid holder. This instantaneously opens the passage for the gas to escape from the U-tube to the liquid holder and further to the pipe leading to the flare. At this stage the gas enters the liquid holder from the U-tube and then passes on to the pipe which carries it to the flare stack thereby burning it. When sufficient quantity of gas has escaped to the flare stack, there is a resultant drop in pressure inside the U-tube enabling the liquid present in the liquid holder to enter the U-tube, through the pipe provided with a non-return valve, due to the action of gravity and thereby sealing the passage of gas from the U-tube to the pipe leading to the flare stack.

BRIEF DESCRIPTION OF THE DRAWINGS

Further objects, features and advantages of the invention appear from the following description of the exemplary embodiments which are diagrammatically illustrated on the attached drawings, wherein:

FIG. I shows the liquid seal in the idle condition.

FIG. II shows the application of a liquid seal for recovery of vented gas where there is one flare.

FIG. III shows the liquid seal withstanding pressure.

FIG. IV shows the liquid seal broken thereby allowing a free passage of gas to the flare stack.

FIG. V shows the application of a liquid seal for recovery of vented gas where more than one flares are used.

DETAILED DESCRIPTION OF THE PREFERRED EMBODIMENTS

Although following examples shows the operation of specific embodiments, many modifications and variations will readily occur to those skilled in the art, accordingly it is not intended to limit the scope of the invention.

Accordingly with reference to the FIG. I, the liquid seal comprises of a bent tube, preferably of U shape, such a U-tube having arm 1 connected to the pipe 8 which collects all the gas vented form the plant and arm 2 connected to the liquid holder 5. A pipe 6 connected to the liquid holder 5 connects to the pipe 9 which leads to the flare stack while a piping 4 provided with a non-return valve 10 connects to the bottom of the U-tube. A drain pipe 3 fitted with a valve is provided at the bottom of the U-tube. The pipe leading to the flare is provided with a blind 11 to block the passage of gas from the plant to the flare stack and also dividing the said pipe; forming pipe 8 and pipe 9.

In another embodiment of the present invention there is provided a pipe 7 connecting the tip of arm 1 to pipe 6 to supply a limited quantity of gas to the flare stack for equalization at the time of restarting the system after maintenance.

The liquid seal assembly can either forms a part of the pipe leading to the flare stack or can be attached to it as shown in the FIG. II where it is installed between the knock out drum 13 and the flare stack 15.

With reference to FIG. II a line 8A collects all the gas vented from across the plant and connects to a knock out drum (KOD) 13. A liquid seal L1 is installed after the KOD 13 and a pipe 9 connects the liquid seal to the flare stack 15. A line 12 is provided originating between the KOD 13 and liquid seal L1 extending to recovery system 14.

During normal operation all the vented gas is collected by line 8A and passed on to KOD 13. Due to the presence of liquid seal L1 and piping blind 11 between the KOD 13 and flare stack 12 the passage of gas to the flare stack is blocked. The gas passes from the KOD 13 through line 12 to the recovery system, 14 and effectively all vented gas is recovered. As no gas escapes from the plant to the flare stake there is no need to keep the flare burning.

When the liquid seal is in operation as shown in FIG. III there is a pressure applied by the gas on the surface of liquid in arm 1 of the U-tube pushing the liquid in downwards direction. There is a corresponding rise in the level of liquid in arm 2. The total length if tube is calculated according to the predetermined value of pressure to be handled as well as to ensure that even the creation of vacuum pressure at the recovery process does not lift the liquid out of the liquid seal. In case of an upset in plant or if the volume of vented gas exceeds the recovery, capacity installed, the pressure of gas rise's in pipe 8. When, due to a large increase in the volume of gas vented or an upset in the plant, the pressure on the surface of the liquid in arm 1 becomes moire than this predetermined value, then the total liquid in the U-tube becomes incapable of exerting a back pressure on the gas and as a result this column of liquid gets displaced completely into the liquid holder 5 breaking the seal instantaneously as shown in the FIG. IV. This makes the U-tube empty of the liquid; giving a free passage to the gas to escape through the U-tube to the liquid holder 5 and then through the pipe 6 to the pipe 9 and finally to the flare stack. The excess gas escapes from pipe 8 to the pipe 9 through the now broken liquid seal L1 and finally to the flare stack 15. In order to prevent the release of uncombusted gas into the atmosphere, an ignition system ignites the flare, burning all the escaping gas.

Thus the gas at high pressure which was difficult to handle and or recover gets released safely to the flare stack.

Due to the action of gravity, the liquid in the liquid holder 5 tries to enter the U-tube through the piping 4 provided with a non-return valve 10. The high pressure of the gas inside the U-tube works against the pressure applied by this liquid, preventing it from entering the U-tube.

As soon as sufficient quantity of gas has escaped to the flare stack or at the normalization of operations, there is a resultant drop in pressure of gas in arm 1 and once this pressure falls below a predetermined limit, the liquid enters the U-tube from the liquid holder 5 through pipe 4 filling the U-tube and sealing it, thereby blocking the passage of gas from the U-tube to the flare; restoring the system to the position shown in FIG. III. This effectively cuts the supply of gas to the flare, and soon the flare gets extinguished.

All the while the recovery process is allowed to continue unhindered and only the gas in excess of the recovery capacity escapes to the flare.

Often at the hydrocarbon production plants, more than one processes are run, thereby leading to plurality of flaring systems. The following example shows the recovery of gas using another embodiment of the present invention in such a situation.

With reference to FIG. V an another line SB collects all the vented gas from an other process and connects to KOD 13A which connects to a second liquid seal L2. A line 9A connects the liquid seal L2 to the flare stack 15A. A line 12A originating between KOD 13A and liquid seal L2 connects to the recovery system 14. A restricted orifice 16 is provided on line 12A.

In case of plurality of flaring systems installed as shown in FIG. V then a line 8B collects all the vented gas from the second process. The gas is passed on to KOD 13A and due to-the presence of liquid seal L2 and piping blind 11, the passage of this gas to the flare stack 15A is blocked. This gas is carried by line 12A to the recovery system 14 and all gas is recovered by the recovery system 14. The gas in the line 12A has more pressure than the gas in line 12 so the flow of gas through line 12A to the recovery process 14 is controlled by employing the restricted orifice 16.

The liquid seal L2 is capable of withstanding higher pressure than the liquid seal L1.

If the pressure of gas in the line 8B increases beyond a predetermined limit then there is a corresponding increase in the pressure in pipe 8 and this breaks the liquid seal L1 starting flaring at the flare stack 15. On a further increase in the pressure beyond a second predetermined limit, the liquid seal L2 breaks flaring gas in the flare stack 15A.

With a fall of pressure below the second mentioned predetermined limit, the liquid seal L2 is restored first, cutting out the supply of gas to the flare stack 15A and soon flare at flare stack 15A gets extinguished. Further fall of pressure below the first mentioned predetermined limit restores the liquid seal L1 cutting out the supply of gas to the flare stack 15. Soon the flare at the flare stack 15 gets extinguished and at this stage all the vented gas is again recovered.

I claim
1. A device comprising:
    (a) a bent tube of U shape, such U-tube having one arm connected to a first pipe collecting vented gas released from a plant and leading to a flare stack, another arm connected to a liquid holder;
    (b) a second pipe, fitted with a non-return valve, connecting the bottom of the liquid holder to the bottom of the U-tube;
    (c) the top of the liquid holder connected to the first pipe leading to the flare stack by a third pipe;
    wherein there is provided a piping connecting the top of one arm of the U-tube to the third pipe;
    the U-tube and the liquid holder forming a structure so as to form the only passage available for the gas to escape from the plant to the flare stack;
    such gas escaping from the plant to the flare only when the liquid in the said U-tube has been completely displaced into the liquid holder due to the pressure applied by such escaping gas.
2. A device as claimed in claim 1 comprising of:
    (a) a pipe means collecting all the gas vented from across the plant process carrying the said gas to knock out drum (KOD) means;
    (b) a liquid seal means and piping blind means installed between the said KOD means and a flare stack means;
    (c) a pipe means originating from between the said KOD means and the said liquid seal means carrying the gas to a recovery system means;

(d) a pipe means collecting all the gas vented from across the second process and carrying such gas to a second KOD means;
(e) a second liquid seal means and piping blind means installed between the said second KOD means and a second flaring means;
(f) a second pipe means originating from between the said second KOD means and the second liquid seal means carrying the gas to the recovery means; such second pipe means provided with a restricted orifice to control the flow of gas from within it to the said recovery means.

3. A device as claimed in claim 2 wherein the said second liquid seal means is capable of withstanding higher pressure than the said first liquid seal means.

4. A device as claimed in claim 2 wherein there is a unitary gas recovery means for plurality of flaring systems.

* * * * *

UNITED STATES PATENT AND TRADEMARK OFFICE
CERTIFICATE OF CORRECTION

PATENT NO. : 7,661,436 B2 Page 1 of 1
APPLICATION NO. : 10/568192
DATED : February 16, 2010
INVENTOR(S) : Padam Singh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Twenty-eighth Day of December, 2010

David J. Kappos
*Director of the United States Patent and Trademark Office*